Figures 1, 2:
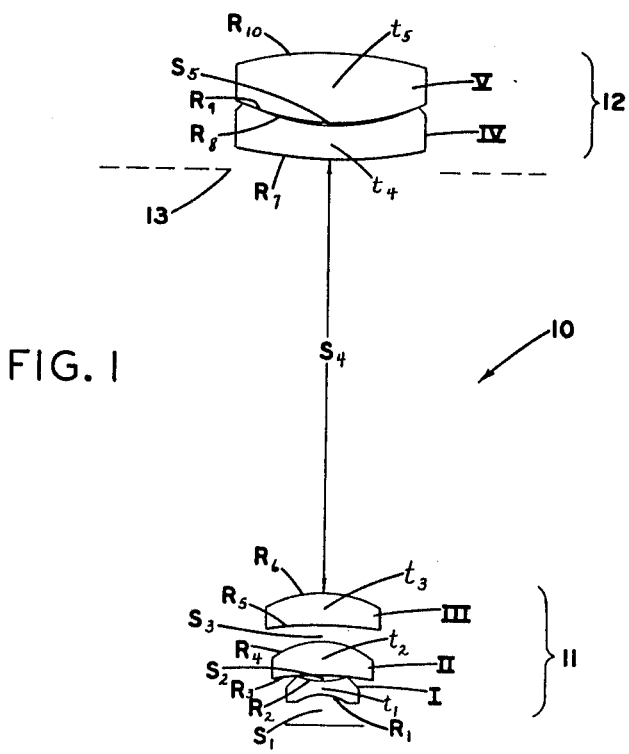

Jan. 21, 1964     P. L. RUBEN     3,118,963
MICROSCOPE OBJECTIVE
Filed April 2, 1962

| E.F. = 20.23 | MAGNIFICATION = 10X | | | N.A. = 0.20 | |
|---|---|---|---|---|---|
| LENS | RADIUS OF LENS SURFACES | THICKNESS | SPACING | FOCAL LENGTH | $n_D$ | $v$ |
| I | $R_1 = -2.704$ | $t_1 = .61$ | $S_1 = 1.70$ | $F_I = -3.87$ | 1.720 | 29.3 |
|   | $R_2 = 100.00$ |   |   |   |   |   |
| II | $R_3 = -58.614$ | $t_2 = 1.70$ | $S_2 = .035$ | $F_{II} = 7.09$ | 1.657 | 57.2 |
|   | $R_4 = -4.365$ |   |   |   |   |   |
| III | $R_5 = -331.13$ | $t_3 = 1.60$ | $S_3 = .83$ | $F_{III} = 11.97$ | 1.517 | 64.5 |
|   | $R_6 = -6.081$ |   |   |   |   |   |
| IV | $R_7 = 115.88$ | $t_4 = 1.70$ | $S_4 = 28.60$ | $F_{IV} = -27.10$ | 1.673 | 32.2 |
|   | $R_8 = 15.849$ |   |   |   |   |   |
| V | $R_9 = 16.444$ | $t_5 = 3.40$ | $S_5 = .030$ | $F_V = 15.97$ | 1.620 | 60.3 |
|   | $R_{10} = -22.909$ |   |   |   |   |   |

INVENTOR.
PAUL L. RUBEN
BY Frank C. Parker
ATTORNEY

3,118,963
MICROSCOPE OBJECTIVE
Paul L. Ruben, Rochester, N.Y., assignor to Bausch & Lomb Incorporated, Rochester, N.Y., a corporation of New York
Filed Apr. 2, 1962, Ser. No. 184,132
3 Claims. (Cl. 88—57)

This invention relates to an optical objective for microscopes, metalloscopes and the like, and particularly relates to improvements in objectives of comparatively low powers.

It is an object of this invention to provide a novel objective for microscopes and the like having a numerical aperture of substantially 0.20 and providing a diffraction-limited flat field of at least 20 mm. diameter in the eyepiece focal plane.

A further object of the invention is to provide a novel objective for microscopes having an exit pupil which falls ahead of the rear lens at a position such that the objective is suitable for applications to varifocal systems without vignetting the extra-axial beam in the verifocal system.

Another object of the invention is to provide an objective having very low distortion and superior zonal spherical aberration even when used at full aperture, with said objective aberrationwise being diffraction-limited with regard to polychromatic and monochromatic image aberrations, and said objective further being simple structurally and low in cost considering the high grade performance thereof.

Other objects and advantages will become apparent from the following detailed description when read in conjunction with the accompanying drawing, wherein:

FIG. 1 is a schematic representation of a preferred embodiment of the invention; and FIG. 2 is a table specifying the constructional data for one example of a preferred form of the invention.

With reference to the drawing, the objective comprising the subject matter of the present invention is represented generally by reference numeral 10 and comprises a front group of lenses 11 and a rear group of lenses 12. The two lens groups 11 and 12 are separated from each other by an air space $S_4$ having an axial dimension defined by the following mathematical expression $$S_4 = 1.395F$$

wherein F designates the equivalent focal length of the entire objective 10.

The front lens group 11 comprises three single air spaced lenses, the foremost being a double concave negative lens I, the intermediate being a positive meniscus lens II, and the last being a positive meniscus lens III with both lenses II and III having their surface of strongest curvature on the rear side. The first lens I of the front lens group 11 may be in edge contact with the second lens and it has a negative focal length $F_I$ substantially numerically equal to .189 times F, the equivalent focal length of the entire objective. The intermediate lens II of the front lens group 11 has a positive focal length $F_{II}$ substantially numerically equal to .346 times F. The third lens III of the front lens group has a positive focal length $F_{III}$ substantially numerically equal to .584 times F.

Rearwardly of the air space $S_4$, the rear lens group 12 comprises a front negative meniscus lens IV having the surface of strongest curvature at the rear, and a positive double convex lens V in edge contact therewith. The negative focal length $F_{IV}$ of the negative lens IV is numerically substantially equal to 1.324 times F and the positive focal length $F_V$ of the rear positive lens V is numerically substantially equal to .78 times F.

The relative powers of the respective lenses I to V together with the chosen lens spacing of the lens system of this objective as designed aforesaid is effective in placing the exit pupil 13 of the system in the space between the two groups of lenses, preferably close to the rear group 12. This location of the exit pupil is advantageous in that it will make possible future contemplated applications of the objective incorporating a varifocal system without vignetting the extra-axial beam of the varifocal system.

It will be noted that the front and rear lens groups 11 and 12 each include a negative lens, the purpose of which is to contribute significantly to the flattening of the field and the achromatism of the objective 10, as well as to assist in providing a low image distortion comparable to the best prior art objectives. To this end the following selected relative values between the refractive indices of the individual lenses and between the individual Abbe numbers pertaining to the individual lenses have been determined to be the most effective.

$$1.715 < n_D(I) < 1.725$$
$$1.652 < n_D(II) < 1.662$$
$$1.512 < n_D(III) < 1.522$$
$$1.668 < n_D(IV) < 1.678$$
$$1.615 < n_D(V) < 1.625$$
$$24 < \nu(I) < 34$$
$$52 < \nu(II) < 62$$
$$60 < \nu(III) < 70$$
$$27 < \nu(IV) < 37$$
$$54 < \nu(V) < 64$$

This invention provides an objective 10 which is strictly diffraction-limited over the entire field which it produces, and in achieving this feature, other properties of the objective are greatly improved. Among these properties is the superior zonal spherical aberration which is mostly achieved by advantageous use of weak lens curvatures, especially in lenses where the image rays strike the curves at the greatest distance from the axis. The amount of spherical zone is only about one-sixth of the value of an ordinary diffraction-limited optical system of equivalent focal length.

The optical parameters given below have all been judiciously selected after much research and calculation in order to obtain a high grade of longitudinal and lateral color correction.

Prescribed values of the parameters or constructional data which result in the above-mentioned advantages of the objective 10 have been found to be as follows, wherein the focal length of the objective 10 is designated by F, the individual focal lengths of the different lenses are designated by $F_I$, $F_{II}$, $F_{III}$, $F_{IV}$, $F_V$ from front to rear, $S_1$, $S_2$, $S_3$, $S_4$, $S_5$ represent the air spaces naming first the air space preceding the front lens I, $R_1$ to $R_{10}$ represent the radii of the lens surfaces named in order, and $t_1$ to $t_5$ designate the respective axial lens thicknesses.

$$F_I = -.189F$$
$$F_{II} = .346F$$
$$F_{III} = .584F$$
$$F_{IV} = -1.324F$$
$$F_V = .780F$$
$$S_1 = .0830F$$
$$S_2 = .00171F$$
$$S_3 = .0405F$$
$$S_4 = 1.395F$$
$$S_5 = .00146F$$
$$R_1 = -.132F$$
$$R_2 = 4.88F$$
$$R_3 = -2.862F$$
$$R_4 = -.213F$$
$$R_5 = -16.15F$$
$$R_6 = -.297F$$
$$R_7 = 5.65F$$
$$R_8 = .776F$$
$$R_9 = .804F$$
$$R_{10} = -1.118F$$
$$t_1 = .0298F$$
$$t_2 = .0830F$$
$$t_3 = .0781F$$
$$t_4 = .0830F$$
$$t_5 = .166F$$

One example of a preferred form of the invention is given in the table shown in FIG. 2 and is also set forth below wherein the equivalent focus E.F. is 20.23, the magnification is 10×, the numerical aperture N.A. is 0.20, $R_1$ to $R_{10}$ are the radii of the lens surfaces, $t_1$ to $t_5$ are the axial thicknesses of the respective lenses, $S_1$ to $S_5$ are the spaces between the lenses, $F_I$ to $F_V$ are the individual focal lengths of the respective lenses numbering the subscripts from the front or object side of the objective, $n_D$ are the refractive indices and $\nu$ are the Abbe numbers for the respective lenses, with all dimensions being given in millimeters.

[E.F.=20.23    Magnification=10×    N.A.=0.20]

| Lens | Radius of Lens Surfaces | Thickness | Spacing | Focal Length | $n_D$ | $\nu$ |
|---|---|---|---|---|---|---|
| | | | $S_1=1.70$ | | | |
| I | $R_1 = -2.704$ | $t_1 = .61$ | | $F_I = -3.87$ | 1.720 | 29.3 |
| | $R_2 = 100.00$ | | $S_2 = .035$ | | | |
| II | $R_3 = -58.614$ | $t_2 = 1.70$ | | $F_{II} = 7.09$ | 1.657 | 57.2 |
| | $R_4 = -4.365$ | | $S_3 = .83$ | | | |
| III | $R_5 = -331.13$ | $t_3 = 1.60$ | | $F_{III} = 11.97$ | 1.517 | 64.5 |
| | $R_6 = -6.081$ | | $S_4 = 28.60$ | | | |
| IV | $R_7 = 115.88$ | $t_4 = 1.70$ | | $F_{IV} = -27.10$ | 1.673 | 32.2 |
| | $R_8 = 15.849$ | | $S_5 = .030$ | | | |
| V | $R_9 = 16.444$ | $t_5 = 3.40$ | | $F_V = 15.97$ | 1.620 | 60.3 |
| | $R_{10} = -22.909$ | | | | | |

From the foregoing description it will be apparent that an objective for a miscroscope and the like has been provided which is simple structurally and of low cost to manufacture, but which is nevertheless designed for high grade performance in accordance with the recited objects of the invention.

A single preferred embodiment of the invention has been shown and described, however, it will be understood that changes and modifications may be made without departing from the spirit or scope of the invention.

What is claimed is:
1. An optical objective for a microscope or the like having a numerical aperture of 0.20 and a magnification of at least 10×, said objective comprising five optically aligned and air spaced lenses which when named in order from the front are a front double concave negative lens, a positive meniscus lens, a positive meniscus lens, a negative meniscus lens, and a double convex positive lens, the symbols $F_I$, $F_{II}$, $F_{III}$, $F_{IV}$ and $F_V$ representing the individual focal lengths of the above-named lenses respectively in the order named, $S_1$, $S_2$, $S_3$, $S_4$ and $S_5$ representing the intervening air spaces wherein $S_1$ is the space between the object surface and the double concave lens, F represents the equivalent focus of the objective, $R_1$ to $R_{10}$ designate the radii of the lens surfaces and $t_1$ to $t_5$ designate the thicknesses of the respective lenses,

$$F_I = -.189F$$
$$F_{II} = .346F$$
$$F_{III} = .584F$$
$$F_{IV} = -1.324F$$
$$F_V = .780F$$
$$S_1 = .083F$$
$$S_2 = .00171F$$
$$S_3 = .0405F$$
$$S_4 = 1.395F$$
$$S_5 = .00146F$$
$$R_1 = -.132F$$
$$R_2 = 4.88F$$
$$R_3 = -2.862F$$
$$R_4 = -.213F$$
$$R_5 = -16.15F$$
$$R_6 = -.297F$$
$$R_7 = 5.65F$$
$$R_8 = .776F$$
$$R_9 = .804F$$
$$R_{10} = -1.118F$$
$$t_1 = .0298F$$
$$t_2 = .0830F$$
$$t_3 = .0781F$$
$$t_4 = .0830F$$
$$t_5 = .166F$$

2. An objective in accordance with claim 1 wherein the refractive indicates $n_D$ and the Abbe numbers $\nu$ for the respective lenses I to V are as specified below:

$$1.715 < n_D \text{ (I)} < 1.725$$
$$1.652 < n_D \text{ (II)} < 1.662$$
$$1.512 < n_D \text{ (III)} < 1.522$$
$$1.668 < n_D \text{ (IV)} < 1.678$$
$$1.615 < n_D \text{ (V)} < 1.625$$
$$24 < \nu \text{ (I)} < 34$$
$$52 < \nu \text{ (II)} < 62$$
$$60 < \nu \text{ (III)} < 70$$
$$27 < \nu \text{ (IV)} < 37$$
$$54 < \nu \text{ (V)} < 64$$

3. A microscopic objective having a numerical aperture of substantially 0.20 and a magnification of at least 10×, said objective comprising five single lenses arranged in two positive optically aligned groups, the constructional data of said objective being specified in the following table wherein $R_1$ to $R_{10}$ are the radii of the lens surfaces, $t_1$ to $t_5$ are the axial thicknesses of said lenses, $S_1$ to $S_5$ are the air spaces and $S_1$ is the space between the object surface and the first lens, $F_I$, $F_{II}$, $F_{III}$, $F_{IV}$ and $F_V$ are the focal lengths of the respective lenses, $n_D$ is the refractive index and $\nu$ is the Abbe number or the relative reciprocal dispersion of the glasses from which the lenses are made,

[E.F.=20.23   Magnification=10×   N.A.=0.20]

| Lens | Radius of Lens Surfaces | Thickness | Spacing | Focal Length | $n_D$ | $\nu$ |
|---|---|---|---|---|---|---|
| I | $R_1 = -2.704$ | $t_1 = .61$ | $S_1 = 1.70$ | $F_I = -3.87$ | 1.720 | 29.3 |
|   | $R_2 = 100.00$ |           | $S_2 = .035$ |               |       |      |
| II | $R_3 = -58.014$ | $t_2 = 1.70$ |         | $F_{II} = 7.09$ | 1.657 | 57.2 |
|   | $R_4 = -4.365$ |            | $S_3 = .83$ |              |       |      |
| III | $R_5 = -331.13$ | $t_3 = 1.60$ |       | $F_{III} = 11.97$ | 1.517 | 64.5 |
|   | $R_6 = -6.081$ |            | $S_4 = 28.60$ |             |       |      |
| IV | $R_7 = 115.88$ | $t_4 = 1.70$ |        | $F_{IV} = -27.10$ | 1.673 | 32.2 |
|   | $R_8 = 15.849$ |            | $S_5 = .030$ |              |       |      |
| V | $R_9 = 16.444$ | $t_5 = 3.40$ |         | $F_V = 15.97$ | 1.620 | 60.3 |
|   | $R_{10} = -22.909$ |         |        |               |       |      |

No references cited.